(12) United States Patent
Jo et al.

(10) Patent No.: US 7,881,663 B2
(45) Date of Patent: Feb. 1, 2011

(54) BEACON SIGNAL GENERATING APPARATUS IN SATELLITE COMMUNICATION SYSTEM AND PHASE SYNCHRONIZING APPARATUS USING THE SAME

(75) Inventors: Jin-Ho Jo, Daejeon (KR); Seong-Pal Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 710 days.

(21) Appl. No.: 11/721,074

(22) PCT Filed: Dec. 8, 2005

(86) PCT No.: PCT/KR2005/004196

§ 371 (c)(1),
(2), (4) Date: Jun. 7, 2007

(87) PCT Pub. No.: WO2006/062361

PCT Pub. Date: Jun. 15, 2006

(65) Prior Publication Data

US 2010/0034137 A1    Feb. 11, 2010

(30) Foreign Application Priority Data

Dec. 9, 2004    (KR) .................. 10-2004-0103782
May 23, 2005  (KR) .................. 10-2005-0043235

(51) Int. Cl.
*H04B 7/19*    (2006.01)
(52) U.S. Cl. .................. 455/13.2; 455/3.02; 455/430; 455/502
(58) Field of Classification Search ............... 455/3.02, 455/427, 430, 452.1, 12.1, 13.2, 502, 509, 455/3.01, 3.03; 370/324
See application file for complete search history.

(56) References Cited

U.S. PATENT DOCUMENTS 6,633,621 B1 * 10/2003 Bishop et al. ............... 375/376

(Continued)

FOREIGN PATENT DOCUMENTS

JP    56050637    5/1981

(Continued)

OTHER PUBLICATIONS

Notification Concerning Transmittal of International preliminary Report on Patentability; Form PCT/IB/326; PCT/KR2005/004196; Jun. 21, 2007.

(Continued)

*Primary Examiner*—John Lee
(74) *Attorney, Agent, or Firm*—Kile Park Goekjian Reed & McManus PLLC

(57) ABSTRACT

Provided are a beacon signal generating apparatus and a phase synchronizing apparatus using the same for establishing a phase synchronization while tracking a phase variation of a Timing Source Oscillator (TSO) of a satellite using a simpler scheme at an earth station, in making a phase synchronization between a clock signal of an On board Switch (OBS) embedded in the satellite and that of the earth station in a Satellite Switched Time Division Multiple Access (SS-TDMA) satellite communication system. The inventive beacon signal generating apparatus embedded in a satellite comprises a frequency oscillator for creating a TSO frequency, a beacon signal generator for multiplying the TSO frequency to be matched with a beacon signal frequency to generate a beacon signal synchronized with the TSO frequency, and a transmitter for transmitting the beacon signal to each of earth stations to recovery a frequency synchronized with the TSO frequency.

4 Claims, 3 Drawing Sheets

U.S. PATENT DOCUMENTS 7,272,175 B2 * 9/2007 Kim et al. .................... 375/226
2006/0045038 A1 * 3/2006 Kay et al. .................... 370/316

FOREIGN PATENT DOCUMENTS

| JP | 60106235 | 6/1985 |
| JP | 07107025 | 4/1995 |
| KR | 19960032931 | 9/1996 |
| KR | 1020020080619 | 10/2002 |

OTHER PUBLICATIONS

All the references cited in the Search Report are previously submitted.

International Search Report; PCT/KR2005/004196; Feb. 28, 2006.

Onboard clock correction for SS/TDMA and baseband processing satellites; T. Inukai and S.J. Campanella; Comsat Tech Review vol. 11, No. 1, Pring 1981pp. 76-103.

* cited by examiner

BEACON SIGNAL GENERATING APPARATUS IN SATELLITE COMMUNICATION SYSTEM AND PHASE SYNCHRONIZING APPARATUS USING THE SAME

TECHNICAL FIELD

The present invention relates to a beacon signal generating apparatus for clock synchronization between an On Board Switch (OBS) and an earth station in a satellite communication system and a phase synchronizing apparatus using the same; and more particularly, to a beacon signal generating apparatus and a phase synchronizing apparatus using the same for preventing data loss by phase difference of clock by maintaining a synchronization between a clock signal of an OBS embedded in a satellite and that of an earth station in a Satellite Switched Time Division Multiple Access (SS-TDMA) satellite communication system that does multi-beam communication.

BACKGROUND ART

There is provided a common method for establishing a clock synchronization between an OBS embedded in a satellite to conduct a multi-beam switching function and a satellite communication earth station referring to FIG. 1.

Differently from an existing communications satellite that simply converts and amplifies a frequency of an uplink signal and then converts an amplified frequency into a downlink signal for its relay, an OBS satellite that does multi-beam communication converts and amplifies a frequency of an uplink signal sent from each of earth stations 20 to 40, and also goes down a signal from each of the earth station 20 to 40 by beam-switching it to a desired area. By doing so, efficient use of limited satellite output is possible and frequency reuse is also allowable by minimizing interference between switched beams.

The satellite communication using such an OBS satellite is called SS-TDMA satellite communication, which is a scheme that transceives signals between areas divided into a plurality of beam regions over communication satellite that supports multi-beam communication, and improves output efficiency of satellite radio wave signal compared to existing satellite communications using single-beam communication satellite and further reuses frequency.

For this, however, the earth stations 20 to 40 prepared in each beam region must transmit a signal burst at the moment of switching operation of an OBS 10 embedded in the satellite. Upon failure, signal loss is occurred due to a discrepancy between the signal burst sent from the earth stations 20 to 40 to the OBS 10 embedded in the satellite and the switching operation of the OBS 10. In addition, signal loss is taken place if an operation clock of the OBS 10 embedded in the satellite is not precisely synchronized with that of the earth stations 20 to 40.

As described above, the switching operation of the OBS 10 embedded in the satellite should be accurately consistent with the signal transmission from the earth stations 20 to 40 for the SS-TDMA communication. Failure to establish the synchronization between the OBS 10 and the earth stations 20 to 40 causes a discontinuation of signal sent from the earth stations 20 to 40 to the satellite by the OBS 10, thereby rendering well preserved signals not transceived between the earth stations 20 to 40.

To solve the above problem, it needs to establish a precise synchronization between a Timing Source Oscillator (TSO) that creates a driving clock of a Digital Control Unit (DCU) to control switching operation of a Microwave Switching Matrix (MSM) embedded in the satellite and a Voltage Controlled Crystal Oscillator (VCXO) that produces a clock for signal transmission of an earth station.

One of prior arts for establishing a phase synchronization between TSO and VCXO is proposed in T. Inukai et al., "Onboard Clock Correction for SS/TDMA and Baseband Processing Satellites", Comsat Technical Review, vol. 11, no. 1, pp. 77-100, Spring, 1981. This prior art discloses a method for conducting a phase synchronization by TSO embedded in a satellite by using VCXO of an earth station as reference.

According to the prior art, however, TSO is provided in the earth station whereas VCXO is prepared in the satellite, as opposed to the invention. Specifically, the earth station extracts a phase error or difference between its own TSO and a frequency of VCXO incorporated in the satellite by monitoring SS-TDMA signal from the satellite and using a start point and an end point of signal frame thereof, and then calculates a phase correction value. And then, it sends the correction value to the satellite over a Tracking, Telemetry and Command (TT&C) channel of a control center and VCXO embedded in the satellite adjusts the phase using the correct value.

However, the existing method has a drawback in that its hardware and software structure and algorithm are complicated to detect the phase error of VCXO in the satellite by the earth station and calculate the correction value.

In other words, in case where the clock synchronization between the OBS 10 in the satellite and the earth stations 20 to 40 is made based on the prior art, it requires a complicated hardware for extracting the phase error of the OBS 10 in the satellite, calculation algorithm of correcting a phase of TSO, and a series of works for sending commands to the satellite over the TT&C channel of the central center. This makes the hardware and software structure and algorithm complicated.

DISCLOSURE

Technical Problem

It is, therefore, an object of the present invention to provide a beacon signal generating apparatus and a phase synchronizing apparatus using the same for establishing a phase synchronization while tracking a phase variation of TSO of a satellite using a simpler scheme at an earth station, in making a phase synchronization between a clock signal of an OBS embedded in the satellite and that of the earth station in an SS-TDMA satellite communication system.

The other objectives and advantages of the invention will be understood by the following description and will also be appreciated by the embodiments of the invention more clearly. Further, the objectives and advantages of the invention will readily be seen that they can be realized by the means and its combination specified in the claims.

Technical Solution

In accordance with one aspect of the present invention, there is provided an apparatus for generating a beacon signal in an On Board Switch (OBS) embedded in a satellite to establish a clock synchronization between the OBS and each of earth stations in a satellite communication system, comprising: a frequency oscillating means for creating a Timing Source Oscillation (TSO) frequency; a beacon signal generating means for multiplying the TSO frequency to be matched with a beacon signal frequency to generate a beacon signal synchronized with the TSO frequency; and a transmitting means for transmitting the beacon signal to the earth stations to recovery a frequency synchronized with the TSO frequency.

In accordance with another aspect of the present invention, there is provided a phase synchronizing apparatus for use in an earth station to establish a clock synchronization between an OBS and the earth station in a satellite communication system, comprising: a frequency multiplying means for multiplying a voltage controlled oscillation frequency; a mixing means for mixing the frequency-multiplied voltage controlled oscillation signal with a beacon signal that is received from a satellite and then low-noise amplified to generate a phase error between the two signals; a phase detecting means for producing a voltage control signal to adjust the phase based on the phase error; and a voltage controlled oscillating means for controlling a voltage in response to the voltage control signal to create a frequency synchronized with a TSO frequency of the satellite.

As mentioned above and below, the invention establishes a clock synchronization between an OBS embedded in a satellite and a satellite communication earth station in an SS-TDMA satellite communication system. Specifically, the invention establishes a synchronization of an operation clock of an earth station using an operation clock of the OBS in the satellite as reference. The earth station receives a clock of the OBS embedded in the satellite by receiving a beacon signal of the satellite; and therefore, the invention doesn't need an extra complex hardware construction and algorithm to extract the clock of the OBS in the satellite at the earth station.

ADVANTAGEOUS EFFECTS

The present invention can remove a data transmission error rate by establishing a synchronization between a clock of a satellite OBS and that of each earth station in an SS-TDMA satellite communication.

Especially, establishing a synchronization between a clock of an OBS embedded in a satellite and that of each earth station according to the invention doesn't require a complicated hardware for extracting a phase error of TSO in the OBS of the satellite, calculation algorithm of correcting a phase of the TSO, and a series of works for sending commands to the OBS of the satellite over a TT&C channel of a control center. Thus, the invention can implement a satellite communication system that enables an SS-TDMA communication with a simple hardware and software structure.

DESCRIPTION OF DRAWINGS

The above and other objects and features of the present invention will become apparent from the following description of the preferred embodiments given in conjunction with the accompanying drawings, in which.

BEST MODE FOR THE INVENTION

The above-mentioned objectives, features, and advantages will be more apparent by the following detailed description associated with the accompanying drawings; and based on this, the invention will be readily conceived by those skilled in the art to which the invention pertains. Further, in the following description, well-known arts will not be described in detail if it seems that they could obscure the invention in unnecessary detail. Hereinafter, a preferred embodiment of the present invention will be set forth in detail with reference to the accompanying drawings.

Figure 1:
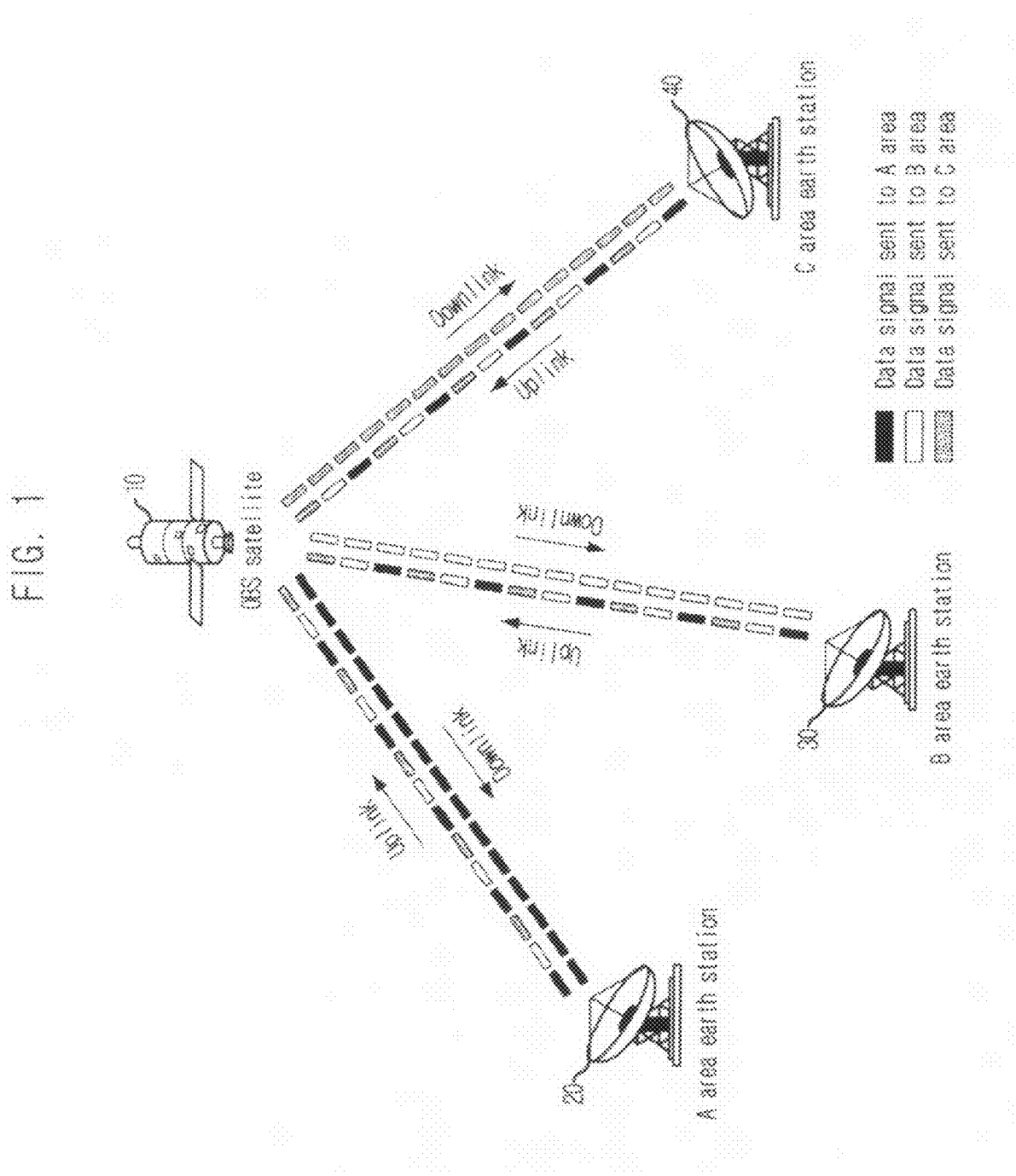
FIG. 1 is a diagram illustrating a configuration of a satellite communication system to which the present invention is applied.

FIG. 1 is a diagram illustrating a structure of a satellite communication system to which the present invention is applied, especially of SS-TDMA satellite communication system that does multi-beam communication.

As set forth above, for satellite communication of SS-TDMA scheme, it is required that a clock synchronization between an OBS 10 embedded in a satellite and earth stations 20 to 40 be established.

The OBS 10 embedded in the satellite divides an area at which its radio wave can arrive into several areas. For example, an A area earth station 20 indicates one of earth stations located in a beam region A of the OBS satellite 10; and B and C areas earth stations 30 and 40 denote earth stations located in beam regions B and C, respectively.

The A area earth station 20 time-divides signals (A->A) to be sent to other earth stations within its own area A as well as signals (A->B, A->C) to be sent to earth stations within other areas, and then sends uplink signals to the OBS 10 in the satellite.

Further, the B area earth station 30 time-divides signals (B->B) to be sent to other earth stations within its own area B as well as signals (B->A, B->C) to be sent to earth stations within other areas, and then sends uplink signals to the OBS 10 in the satellite.

And also, the C area earth station 40 time-divides signals (C->C) to be sent to other earth stations within its own area C as well as signals (C->A, C->B) to be sent to earth stations within other areas, and then sends uplink signals to the OBS 10 in the satellite.

Next, the OBS 10 embedded in the satellite performs a time division switching for RF signals sent from the earth stations 20 to 40 of each area; and classifies them into signals (A->A, B->A, C->A) to be sent to A area, signals (A->B, B->B, C->B) to be sent to B area, and signals (A->C, B->C, C->C) to be sent to C area.

And then, the classified signals are downlink-processed via a satellite antenna that directs to each area. By doing so, the downlink signals of A, B and C areas are switched and transmitted to A, B and C areas by switching operation of the satellite, respectively.

Differently from the prior arts, the invention incorporates TSO in the OBS 10 of the satellite and VCXO in each of the earth stations 20 to 40. In this arrangement, the invention allows the VCXO of each earth station to adjust a phase of TSO arranged in the OBS 10 of the satellite.

For this, the OBS 10 of the satellite includes a beacon signal generator (BTX) which generates a beacon signal by multiplying a frequency of TSO n times and makes a TSO frequency involved in the beacon signal always sent to ground. And each of the earth stations 20 to 40 receives and divides the beacon signal sent from the OBS 10 of the satellite and then generates a VCXO signal synchronized with TSO of the OBS 10 using a phase detector.

Through such a method, if a clock synchronization between the OBS 10 embedded in the satellite and the earth stations 20 to 40 is established, it doesn't require a complicated hardware structure for extracting the phase error in the OBS 10 of the satellite, calculation algorithm of correcting a phase of TSO, and a series of works for sending commands to the OBS 10 of the satellite over a TT&C channel of a central center, differently from the prior arts. Thus, the invention can implement a satellite communication system that enables SS-TDMA communication with a simple hardware and software structure.

Figure 2:
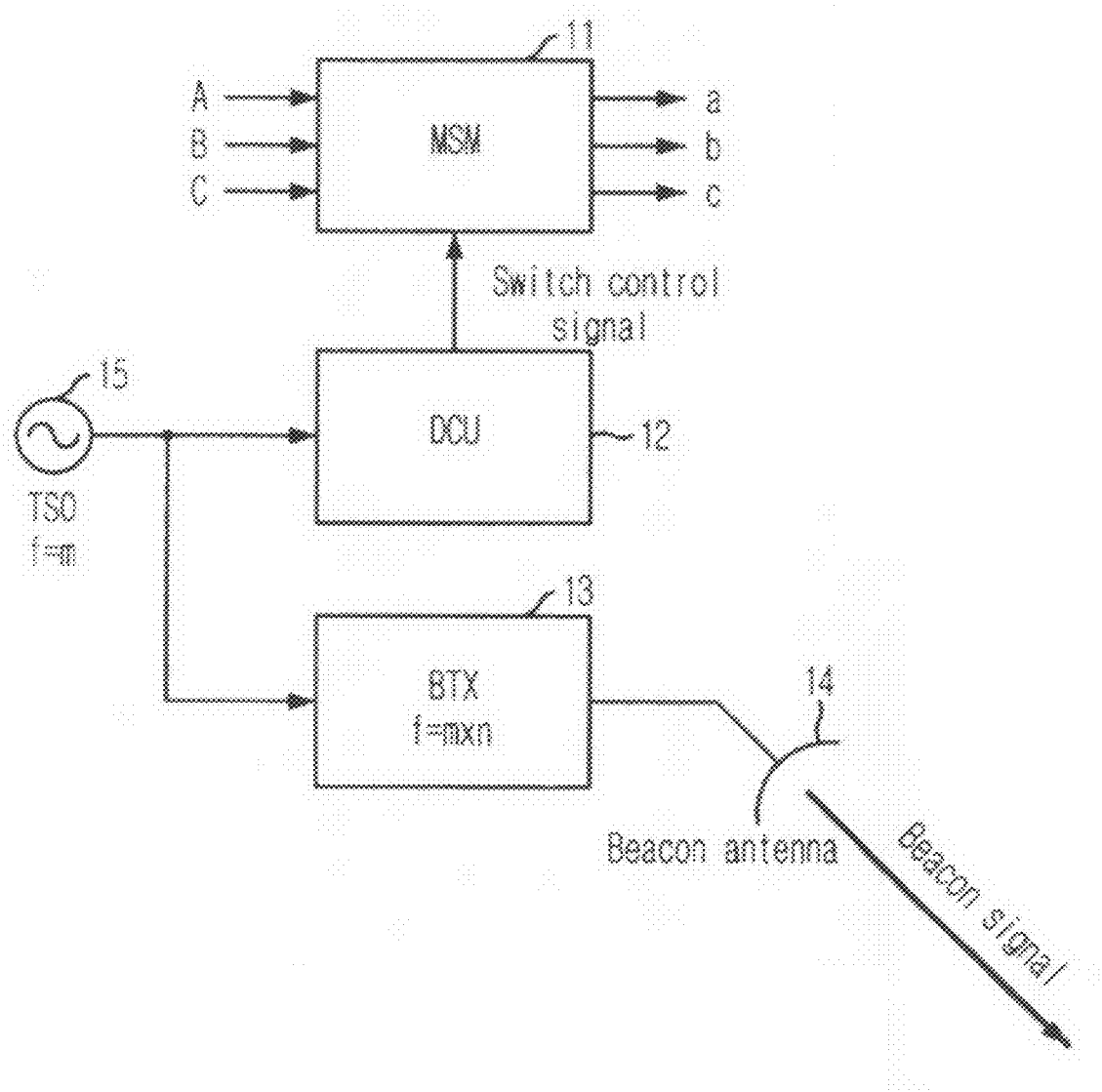
FIG. 2 is a diagram showing a configuration of a beacon signal generating apparatus contained in the OBS in accordance with an embodiment of the invention.

FIG. 2 is a diagram showing a configuration of a beacon signal generating apparatus included in the OBS in accordance with an embodiment of the invention.

An MSM 11 switches and converts uplink signals A, B, C sent from the earth stations 20 to 40 into downlink signals a, b, c and then sends them to the earth stations 20 to 40 of each area.

This MSM 11 is operated under the control of a DCU 12, which stores a switching sequence necessary for control of the MSM 11 in a memory and then controls it by reading the sequence in order.

Specifically, the DCU 12 reads the switching sequence data stored in the memory depending on a clock synchronized with a TSO 15 and sends it to the MSM 11 to control on/off operations of switches therein. Therefore, the on/off operations of the switches in the MSM 11 are made in synchronization with a frequency of the TSO 15. Accordingly, the frequency of the TSO 15 is used as a reference frequency of the switching operation of the MSM 11 and a signal synchronized with the frequency of the TSO 15 should be sent for the earth stations to synchronize with the switching operation of the OBS satellite 10.

In short, in order to establish the clock synchronization between the OBS 10 and the earth stations 20 to 40 in the SS-TDMA satellite communication system, the beacon signal generating apparatus of the OBS 10 comprises the TSO 15 for generating a TSO frequency, the BTX 13 that multiplies the frequency of the TSO 15 n times 15 to be matched with a beacon signal frequency to create a beacon signal synchronized with the frequency of the TSO 15, and a beacon antenna 14 for transmitting the beacon signal to the earth stations 20 to 40 to recover a frequency synchronized with the frequency of the TSO 15.

As described above, to notify the earth of the frequency of the TSO 15, the OBS 10 embedded in the satellite creates the beacon signal wherein the frequency of the TSO 15 is used as reference frequency.

That is, the BTX 13 creates the beacon signal for antenna tracking and uplink power control by the earth stations 20 to 40 and then transmits the same to the earth stations 20 to 40 via the beacon antenna 14.

Specifically, the BTX 13 makes the beacon signal by multiplying the frequency of the TSO 15 n times and transmits it to the earth stations 20 to 40. Then, the earth stations 20 to 40 can receive the beacon signal and recover a frequency synchronized with the frequency of the TSO 15 based on the received beacon signal through a phase synchronizing apparatus, as given in FIG. 3.

Figure 3:
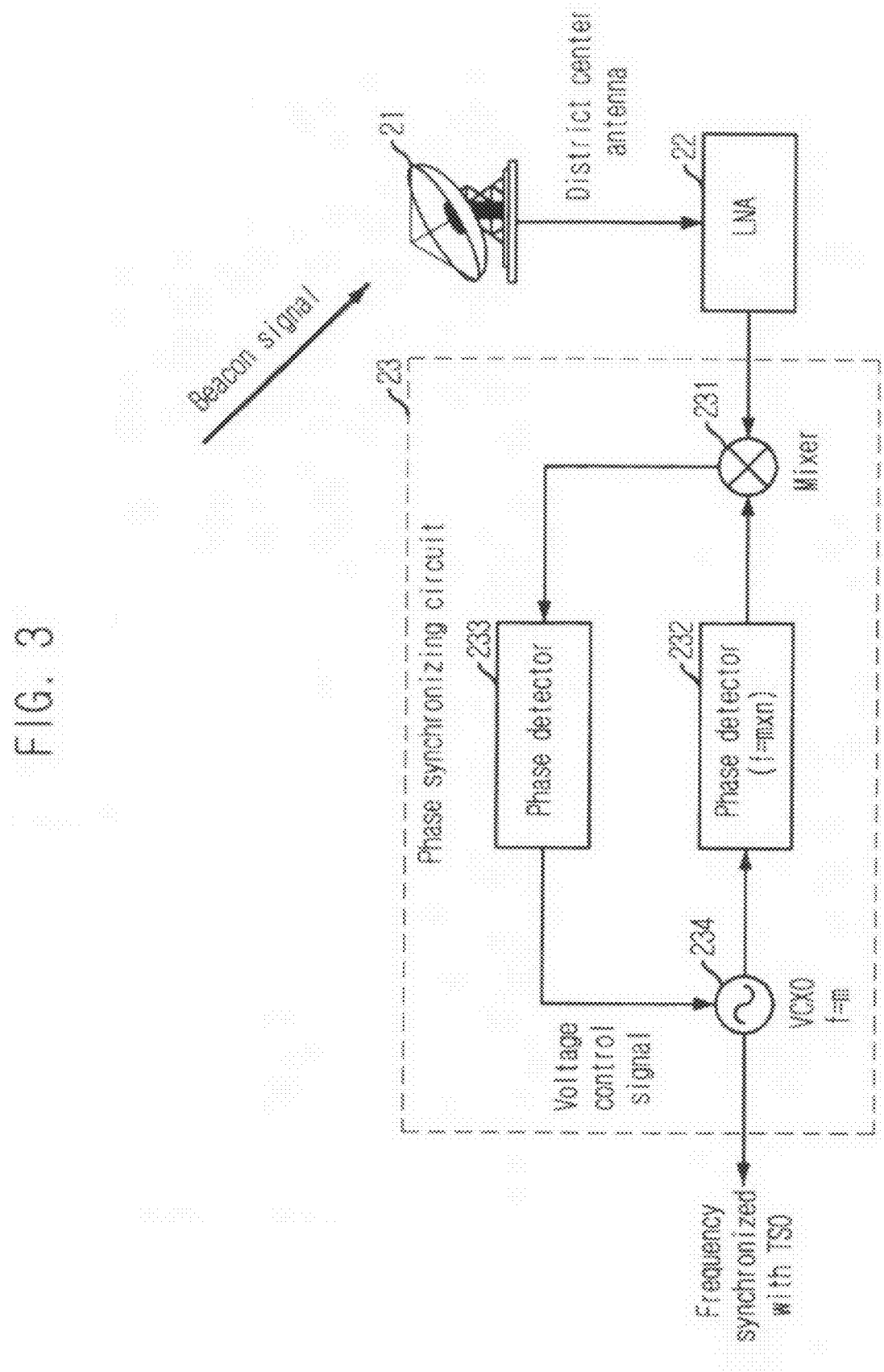
FIG. 3 is a diagram showing a configuration of a phase synchronizing apparatus of each earth station in accordance with an embodiment of the invention.

FIG. 3 is a diagram showing a configuration of a phase synchronizing apparatus of each earth station in accordance with an embodiment of the invention.

The beacon signal sent from the beacon signal generating apparatus of the OBS 10, embedded in the satellite, as shown in FIG. 2, is received by a district center antenna 21 of each of the earth stations 20 to 40.

Next, the beacon signal received by the district center antenna 21 is amplified by a Low Noise Amplifier (LNA) 22. Meanwhile, a VCXO signal multiplied by a frequency multiplier 232 is mixed with the beacon signal received by a mixer 231 connected to the LNA 22 to create a phase error or difference between the two signals. The phase error between the two signals is converted into a DC voltage by a phase detector 233 and used as a signal to adjust a phase of a VCXO 234.

If the phase of the beacon signal received by the district center antenna 21 is consistent with that of a signal created by the VCXO 234, no phase error exists between the two signals as the output of the mixer 231, thereby allowing a control voltage of the VCXO 234 to be produced as 0 V by the phase detector 233. This shows that the phase synchronization between the received beacon signal and the VCXO 234 is precisely achieved.

The mixer 231 continues to create a phase error between the beacon signal received by the district center antenna 21 and the signal created by the VCXO 234 until the phase synchronization therebetween is made. The phase error so created controls a phase of the VCXO 234 through the phase detector 233, in which the operation is continued until the phase of the VCXO 234 is synchronized with the beacon signal received by the district center antenna 21.

If the phase of the received beacon signal is synchronized with that of the signal generated by the VCXO 234 and thereafter varied due to a phase variation of the TSO 15 embedded in the satellite, the mixer 231 creates a phase error and the phase detector 233 produces and feeds a corresponding DC voltage to the VCXO 234. In response to the DC voltage, the VCXO 234 is operated until the phase error between itself and the received beacon signal is not occurred.

In brief, in order to establish the clock synchronization between the OBS 10 and the earth stations 20 to 40 in the SS-TDMA satellite communication system, the phase synchronizing apparatus of the earth stations 20 to 40 comprises the frequency multiplier 232 for multiplying a VCXO frequency, the mixer 231 for mixing a frequency-multiplied voltage controlled oscillation signal with a beacon signal that is received from the OBS 10 and then low-noise amplified to create a phase error therebetween, the phase detector 233 for generating a voltage control signal to adjust the phase based on the phase error, and the VCXO 234 for controlling a voltage in response to the voltage control signal and creating a frequency synchronized with a frequency of the TSO 15 of the OBS 10 embedded in the satellite.

As described above, it is structured in such a way that the BTX 13 makes use of the signal of the TSO 15 as reference of the switching time of the MSM 11 that is embedded in the OBS satellite for multi-beam communication and performs the switching operation between multi beams for the SS-TDMA communication and the VCXO 234 is configured to synchronize with the phase of the TSO 15 of the OBS 10 embedded in the satellite using the received beacon signal at the earth stations 20 to 40. Therefore, such a structure doesn't need a complicated hardware required at the ground for extracting a phase error of the TSO 15 of the OBS 10 embedded in the satellite, calculation algorithm of correcting a phase of the TSO 15, and a series of works for sending commands to the satellite over a TT&C channel of a control center, differently from the prior arts. Thus, the invention can implement a satellite communication system that enables the SS-TDMA communication with a simple hardware and software structure.

In addition, it is structured such that the BTX 13 serving as the above function doesn't employ a certain RF signal but utilizes a signal obtained by multiplying a frequency of the TSO 15 used as a reference clock of the SS-TDMA communication to be consistent with a beacon signal frequency to be used to create the beacon signal and then sends it to the earth stations via the beacon antenna 14. At the same time, the earth stations 20 to 40 are configured to synchronize the VCXO 234 with the TSO 15 of the OBS 10 embedded in the satellite using the received beacon signal.

While the present invention has been described with respect to certain preferred embodiments, it will be apparent to those skilled in the art that various changes and modifications may be made without departing from the scope of the invention as defined in the following claims.

What is claimed is:

1. A phase synchronizing apparatus for use in an earth station to establish a clock synchronization between an On Board Switch (OBS) and the earth station in a satellite communication system, comprising:
   a frequency multiplying means for multiplying a voltage controlled oscillation frequency;
   a mixing means for mixing the frequency-multiplied voltage controlled oscillation signal with a beacon signal that is received from a satellite and then low-noise amplified to generate a phase error between the two signals;
   a phase detecting means for producing a voltage control signal to adjust the phase based on the phase error; and
   a voltage controlled oscillating means for controlling a voltage in response to the voltage control signal to create a frequency synchronized with a Timing Source Oscillation (TSO) frequency of the satellite.

2. The phase synchronizing apparatus as recited in claim 1, wherein the mixing means generates a phase error between the beacon signal received by a central station antenna and the signal created by the voltage controlled oscillating means until a phase synchronization between the two signals is established.

3. The phase synchronizing apparatus as recited in claim 2, wherein the phase detecting means is repeatedly operated to control a phase of the voltage controlled oscillating means based on the generated phase error until the phase of the voltage controlled oscillating means is synchronized with the beacon signal received by the central station antenna.

4. The apparatus as recited in claim 1, wherein the voltage control signal is a DC voltage which is used to adjust the phase of the voltage controlled oscillating means.

* * * * *